Sept. 20, 1932.  E. R. ZADEMACH  1,878,568
WASHING MACHINE
Original Filed March 5, 1926
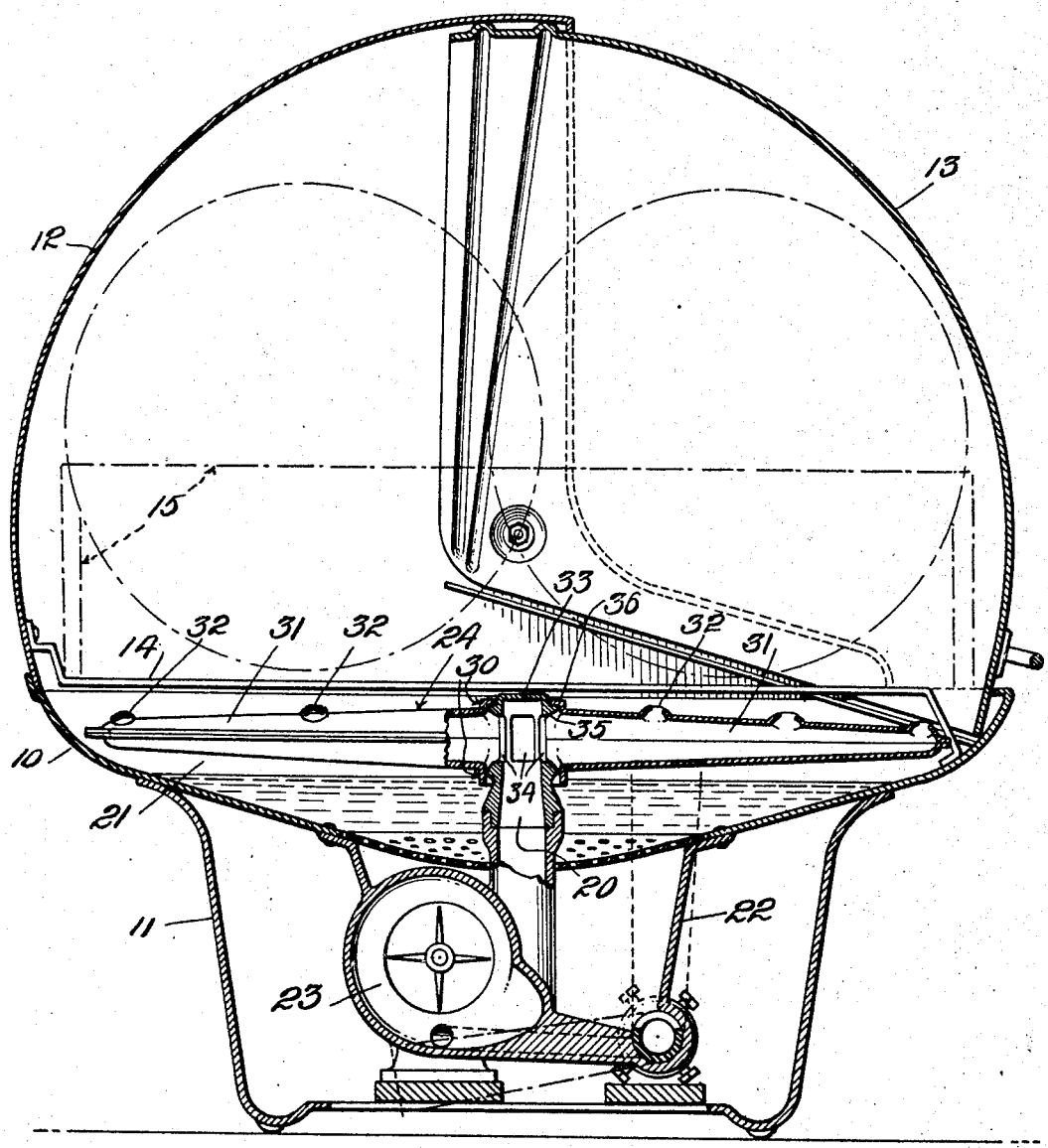
INVENTOR
Erich R. Zademach
BY Robert W. Byerly
his ATTORNEY Patented Sept. 20, 1932

1,878,568

UNITED STATES PATENT OFFICE

ERICH R. ZADEMACH, OF NEW ROCHELLE, NEW YORK, ASSIGNOR, BY MESNE ASSIGNMENTS, TO HOBART MANUFACTURING COMPANY, OF TROY, OHIO, A CORPORATION OF OHIO

WASHING MACHINE

Original application filed March 5, 1926, Serial No. 92,387. Divided and this application filed July 8, 1927. Serial No. 205,858.

This invention relates to washing machines and aims to provide a simple, inexpensive, compact, and effective dishwashing machine for household use.

A particular object of the invention is to provide such a machine in which the washing liquid is effectively distributed over the soiled articles, while, at the same time, the part of the machine which receives the liquid which is passed over the soiled articles—which, for brevity, I shall call the catch basin—is readily accessible for cleaning.

A washing machine embodying the invention has a vertical supply conduit projecting up through its catch basin and removable means for supporting dishes or the like over the catch basin just above the upper end of the conduit. The liquid supplied through the conduit is distributed over the dishes by a rotary distributor which merely rests on the conduit so that it may be lifted therefrom to provide access to the catch basin for cleaning purposes. At the same time, the conduit and distributor are so arranged that, no matter how great the pressure of the liquid supplied through the conduit to the distributor, the distributor cannot be blown off the conduit and against the dishes.

A specific embodiment of the invention is shown in the accompanying drawing, which shows a household dishwashing machine in transverse section.

The casing of the machine illustrated includes a catch basin 10, mounted on a support 11, and a cover consisting of a fixed part 12, and a movable part 13 which may be opened. Tracks 14 in the casing support dish-rack 15 which may be removed from the casing when the movable part of the cover 13 is open.

A vertical supply conduit 20 projects up in the middle of the catch basin and has its upper end just below the tracks 14.

The particular form of the catch basin and the amount of water maintained in it, if any, during the operation of the machine are immaterial so far as the present invention is concerned. So also is the source of liquid under pressure which is supplied through the conduit 20. In so far as the drawing shows the catch basin 10 as including a shallow tank 21 and a sump 22 containing a pump 23 for collecting the water which has passed over the dishes and forcing it through the conduit 20, they are to be regarded merely as illustrating one practical embodiment of the invention.

The liquid supplied through the conduit 20 is distributed over the dishes by a distributor 24 which rotates in the space between the catch basin and the dish-rack. The distributor has a hub 30 and radial arms 31 provided with upwardly directed nozzles 32, some of which are inclined so as to cause the distributor to be rotated. The nozzles contain discharge slits, whose opened area is very small compared to the cross-sectional area of the hub of the distributor. The hub 30 rests on the conduit 20, but is not held on the conduit in any way, and may, in consequence, be lifted from the conduit to expose the catch basin for cleaning. In the form shown, the hub 30 is open at both ends and has, at its upper end, an internal flange 36, which rests on an external flange 35 at the upper end of the conduit 20. When the flange 36 is resting on the flange 35, the hub surrounds the upper portion of the conduit 20 and receives liquid under pressure through lateral openings 34 in this portion of the conduit. The area of the opening in the lower end of the hub is the same as that of the recess in the upper face of hub which receives the flange 35. Escape of liquid from the upper end of the hub is prevented by closure 33, fixed on the upper end of the conduit. This closure receives the upward thrust of the liquid under pressure within the hub, and, since it is fixed to the conduit, it prevents this pressure from acting on the distributor, so that, even if the pressure is far too great to be resisted by the weight of the distributor, the distributor is not blown upwardly.

For easy rotation, the parts are made to fit loosely so that some leakage occurs between the flanges 35 and 36, and also around the lower end of the hub. The flange 36 and the whole distributor, in effect, floats on the film of liquid leaking between the flanges 35 and 36, so that there is almost no frictional resistance in rotation of the distributor. But, for practical purposes, all the water supplied through the conduit is directed into the arms and out through the nozzles against the dishes.

When a batch of dishes has been washed and the movable rack has been removed, it is necessary only to lift off the distributor in order to have access to the catch basin to clean it. After the cleaning, the distributor may be replaced by merely dropping it into position over the upper end of the conduit.

What I claim is:

A water distributing device for washing machines comprising a reaction-driven rotary wash arm and a conduit supplying liquid thereto, the wash arm and the conduit being provided with opposed freely separable annular surfaces at the upper side of the wash arm, between which the liquid in the wash arm flows out to provide a film of liquid on which the wash arm rides.

In testimony whereof I have hereunto set my hand.

ERICH R. ZADEMACH.